(12) United States Patent
Boyd et al.

(10) Patent No.: US 6,380,894 B1
(45) Date of Patent: Apr. 30, 2002

(54) MULTI-LATERATION SYSTEM WITH AUTOMATIC CALIBRATION AND ERROR REMOVAL

(75) Inventors: Robert W. Boyd, Edison; Donald K. Belcher; Michael A. Wohl, both of Rogersville, all of TN (US)

(73) Assignee: Wherenet Corporation, Santa Clara, CA (US)

( * ) Notice: Subject to any disclaimer, the term of this patent is extended or adjusted under 35 U.S.C. 154(b) by 0 days.

(21) Appl. No.: 09/649,646

(22) Filed: Aug. 29, 2000

Related U.S. Application Data

(63) Continuation-in-part of application No. 09/442,710, filed on Nov. 19, 1999, now Pat. No. 6,121,926.
(60) Provisional application No. 60/151,519, filed on Aug. 30, 1999, and provisional application No. 60/155,342, filed on Sep. 22, 1999.

(51) Int. Cl.[7] ................................................. G01S 3/02
(52) U.S. Cl. ........................ 342/450; 342/451; 342/465
(58) Field of Search ................................ 342/450, 451, 342/465

(56) References Cited

U.S. PATENT DOCUMENTS 6,167,275 A * 12/2000 Oros et al. .................. 455/456

* cited by examiner

Primary Examiner—Mark Hellner
(74) Attorney, Agent, or Firm—Allen, Dyer, Doppelt, Milbrath & Gilchrist, P.A.

(57) ABSTRACT

An asset management radio location system uses time-of-arrival differentiation for random and repetitive spread spectrum, short duration transmissions from object-attached tags, to geolocate objects within a monitored environment. An object location processor is coupled to distributed tag transmission readers over signal transport paths having different transport delays, and carries out time-of-arrival differentiation of first-to-arrive transmissions from a tag to determine where its object is located. Geolocation errors associated with variations in parameters of the signal transport paths are effectively removed by installing one or more 'reference' tags, whose geolocations are precisely known. Using a background calibration routine that is exercised at a relatively low cycle rate, emissions from the reference tags are processed and coupled to the geolocation processor. The calculated geolocations of the reference tags are compared with their actual locations. Any offset between the two geolocation values is used to adjust time delay offsets associated with signal transport paths between the readers and the geolocation processor.

18 Claims, 5 Drawing Sheets

MULTI-LATERATION SYSTEM WITH AUTOMATIC CALIBRATION AND ERROR REMOVAL

CROSS-REFERENCE TO RELATED APPLICATIONS

The present application claims the benefit of U.S. Provisional Patent Applications, Serial Nos. 60/151,519 and 60/155,342, respectively filed Aug. 30, 1999 and Sep. 22, 1999, by Robert W. Boyd et al, entitled: "Multi-Lateration System With Automatic Calibration and Error Removal," and is a continuation-in-part of U.S. Non-Provisional patent application Ser. No. 09/442,710, filed Nov. 19, 1999, now U.S. Pat. No. 6,121,926 by Donald K. Belcher et al, entitled: "Radio Geo-Location System With Advanced First Received Wavefront Arrival Determination," (hereinafter referred to as the '710 application), each application being assigned to the assignee of the present application and the disclosures of which are incorporated herein.

FIELD OF THE INVENTION

The present invention relates in general to object location and tracking systems that identify identification of locations of radio-tagged objects, and is particularly directed to the use of a periodically exercised, reference tag-based mechanism for removing timing errors associated with cable plant and other components of signal transport paths between a plurality of geographically distributed readers and an object location processor. The object location processor executes time-of-arrival differentiation of first-to-arrive transmissions from tags as detected by the readers. Removal of timing errors ensures that the object location processor will precisely geolocate a tagged object in the field of view of the readers.

BACKGROUND OF THE INVENTION

As described in the introductory portion of the above-referenced '710 application, the U.S. Patent to Heller, U.S. Pat. No. 5,119,104, entitled: "Location System Adapted for Use in Multipath Environments" describes a motion-based system for tracking objects 'tagged' with micro-miniaturized radio transmitters, that are normally in a quiescent mode, until triggered by associated motion sensors. When the object is moved, a motion sensor causes its tag transmitter to emit an RF signal encoded with the identification of the tag; as long as the object is moving, its tag will transmit. Using multi-lateration receivers distributed in the monitored area of interest, and referenced to a time base for time-of-arrival processing, the location of a radio tag and thereby its object can be tracked, while the object is being moved, up to the point where it is at rest. The tag radio then reverts to quiescent mode, with transmission disabled until the object is again moved.

A principal shortcoming of such a motion-dependent object tracking system is the fact that, in addition to being dependent up the object being moved, and contrary to what the patent alleges, the patented system does not effectively solve the problem of multipath inputs to its tracking receiver subsystem. This latter shortcoming is due to the fact that it employs relatively simple amplitude detection receivers that operate on the assumption that the strongest signal will be the first-to-arrive signal. This means that the Heller approach will erroneously use a later arriving, large amplitude, multipath signal, rather than a relatively weak, but first-to-arrive signal, that has traveled to the receiver in a direct path through an attenuating medium.

A further deficiency of the system proposed in the Heller patent is the fact that it is not concerned with the more fundamental problem of asset management. Asset management not only addresses the need to locate and track processed components in the course of their travel through a manufacturing and assembly sequence, but is also concerned with the more general problem of component and equipment inventory control, where continuous knowledge of the whereabouts of any and all assets of a business, factory, educational, military or recreational facility, and the like, is desired and/or required. An asset management system may also benefit from status information that can be provided to the tag, by means of an auxiliary sensor associated with the tag—something not addressed by the Heller scheme.

Advantageously, the deficiencies of conventional object location systems, such as that proposed in the Heller patent, are successfully remedied by tagged object geolocation systems of the type described in the U.S. Patents to Belcher et al, U.S. Pat. Nos. 5,920,287, and 5,995,046, assigned to the assignee of the present application and the disclosures of which are incorporated herein.

The overall architecture of these significantly improved tagged object geolocation systems is shown diagrammatically in FIG. 1 as comprising a plurality of tag emission readers 10 geographically distributed within and/or around an asset management environment 12. The environment contains a plurality of objects/assets 14, whose locations are to be monitored on a continuous basis and reported to an asset management data base 20, which is accessible by way of a computer workstation or personal computer, as shown at 26. Each of the tag emission readers 10 monitors the asset management environment for emissions from one or more tags 16 affixed to the objects 14. Each tag 16 repeatedly transmits or 'blinks' a very short duration, wideband (spread spectrum) pulse of RF energy, that is encoded with the identification of its associated object and other information stored in tag memory.

For this purpose, the tag emission readers 10 are installed at fixed (precisely geographically known), relatively unobtrusive locations within and/or around the perimeter of the environment, such as doorway jams, ceiling support structures, and the like. Each tag reader 10 is coupled to an associated reader output processor of an RF processing system 24, which is operative to correlate the spread spectrum signals received from a tag with a set of spread spectrum reference signal patterns, and thereby determine which spread spectrum signals received by the reader is a first-to-arrive spread spectrum signal burst transmitted from the tag.

The first-to-arrive signals extracted by reader output processors from the signals supplied from the tag emission readers 10 are coupled to an object location processor within the processing system 24. The object location processor performs time-of-arrival differentiation of the detected first-to-arrive transmissions, and thereby locates (within a prescribed spatial resolution (e.g., on the order of ten feet) the tagged object of interest.

In order to mitigate against the potential for fades and nulls resulting from multipath signals destructively combining at one or more readers, the geolocation system of FIG. 1 may be augmented to employ a spatial diversity-based receiver-processing path architecture. In accordance, with this architecture, rather than employ a single RF signal processing path for each reader location, a plurality of readers (e.g., two readers) are installed at each monitoring location, and associated signal processing paths are coupled therefrom to the geometry (triangulation) processor.

FIG. 2 diagrammatically shows a non-limiting example of this augmented geolocation system in which a plurality (e.g., two) of tag emission readers are located at geographically distributed monitoring locations, three of which are shown at $10_1$, $10_2$, $10_3$. Monitoring location $10_1$ has first and second tag readers $10_1$-1 and $10_1$-2, whose respective output signal processing paths include first arrival detector units $11_1$-1 and $11_1$-2. Coupled with the RF signal processing circuits of the front ends of the tag readers $10_1$-1 and $10_1$-2 are antennas $210_1$-1 and $210_1$-2. To provide spatial diversity-based mitigation of multipath signals, the antennas $210_1$-1 and $210_2$-1 are spaced apart by a distance sufficient to effectively statistically minimize destructive multipath interference at both antennas simultaneously.

For the other two monitoring locations of FIG. 2, monitoring location $10_2$ has first and second spatially diverse antennas $210_2$-1 and $210_2$-2, which feed tag readers $10_2$-1 and $10_2$-2, whose outputs are coupled by way of first arrival detector units $11_2$-1 and $11_2$-2 to triangulation geometry processor 400. Similarly, monitoring location $10_3$ has first and second spatially diverse antennas $210_3$-1 and $210_3$-2, which feed tag readers $10_3$-1 and $10_3$-2, coupled to tag readers $10_3$-1 and $10_3$-2, the outputs of which are coupled by way of first arrival detector units $11_3$-1 and $11_3$-2 to the triangulation geometry processor 400.

The triangulation geometry processor 400 employs a standard multi-lateration algorithm that relies upon time-of-arrival inputs from at least three detectors (in the example of FIG. 2, three detector unit pairs $11_1$-1/$11_1$-2; $11_2$-1/$11_2$-2; and $11_3$-1/$11_3$-2) to compute the location of the tagged object 16. The multi-lateration algorithm executed by processor 400 employs a front end subroutine that selects the earlier-to-arrive outputs of the detector pairs $11_1$-1/$11_1$-2; $11_2$-1/$11_2$-2; and $11_3$-1/$11_3$-2, as the value to be employed in the multi-lateration algorithm. Because of the use of spatial diversity, there is an extremely high probability (on the order of ninety percent or greater) that at least one of the two readers $10_i$-1 and $10_i$-2 at any given reader location $10_i$ will provide a first-to-arrive output value to the processor 400 for any tag emission.

FIG. 3 diagrammatically shows a modification of the embodiment of FIG. 2, in which a plurality of auxiliary 'phased array' signal processing paths (four of which are shown at $13_i$-1, $13_i$-2, $13_i$-3 and $13_i$-4) are coupled to the antenna pair $210_i$-1 and $210_i$-2, in addition to the paths containing the readers $10_i$-1, $10_i$-2, and their associated first arrival detector units $11_i$-1 and $11_i$-2 that feed the processor 400. Each phased array path $13_i$-j sums energy received from the two antennas in a prescribed phase relationship, with the energy composite being coupled to the associated readers and detector units that feed the processor 400.

The phased array architecture of FIG. 3 addresses the situation in a multipath environment where a relatively 'early' signal may be canceled by an equal and opposite signal arriving from a different direction. Advantage is taken of the array factor of a plurality of antennas to provide a reasonable probability of effectively ignoring the destructively interfering energy. The phased array provides each reader site with the ability to differentiate between received signals, by using the 'pattern' or spatial distribution of gain to receive one incoming signal and ignore the other.

Regardless of the geolocation architecture employed, a typical installation will contain varying lengths of cable plant (such as RF coax) that connect the readers to the RF processor. In some cases, the cables can be very short and may be indoors. In other cases, at the same site, the cables can be very long and may be outdoors. This differential cable length and environment parameter situation creates the possibility of system timing errors, associated with the cable delays drifting due to weather or other effects (e.g., age, humidity, temperature, physical stretching, etc.), resulting in geolocation errors.

SUMMARY OF THE INVENTION

In accordance with the present invention, this signal transport delay problem is effectively obviated by placing one or more 'reference' tags, whose geolocations, like those of the tag emission readers, are fixed within the monitored environment containing the objects to be tracked, and precisely known. Using a background calibration routine that is exercised at a relatively low cycle rate, emissions from the reference tags are processed and coupled to the geolocation processor. The calculated geolocations of the reference tags are compared with their actual locations, which may be stored in a calibration database or stored in memory on board the reference tag and included as part of the information transmitted by the reference tag and received by transmission readers. Any offset between the two geolocation values (measured and actual) is used to adjust the time delays of the various (cable plant) signal transport paths between the readers and the geolocation processor, and thereby track out associated timing errors.

DETAILED DESCRIPTION

Before detailing the reference tag-based calibration and timing error removal mechanism of the invention, it should be observed that the present invention resides primarily in an augmentation to a geolocation system of the type described in the above-referenced Belcher et al Patents and '710 application. A first aspect of this augmentation includes the placement of one or more calibration or reference tags (which may be identical to object tags employed in the above-referenced Belcher et al Patents and '710 application) at locations within the environment whose geo-coordinates are very precisely known.

A second aspect of this augmentation includes a modification of the signal processing software executed by the geolocation processor, to periodically update signal transport delay values associated with cable plant and any other components installed between the readers and the geolocation processor, based upon differences between the measured geolocations of the reference tags and their known true locations stored in memory, such as a geolocation processor database or memory on board the tag and included as part of a respective tag transmission.

As such, the invention is readily implemented in an arrangement of conventional communication circuits and associated digital signal processing components and attendant supervisory control circuitry therefor, that controls the operations of such circuits and components. The configuration of such circuits components and the manner in which they interface with other communication system equipment have, therefore, been illustrated in readily understandable block diagram format, depicting details that are pertinent to the present invention, so as not to obscure the disclosure with details which will be readily apparent to those skilled in the art having the benefit of the description herein. Thus, the block diagram illustrations are primarily intended to show the major components of a tag-based geolocation system in a convenient functional grouping, whereby the present invention may be more readily understood.

Figure 1:
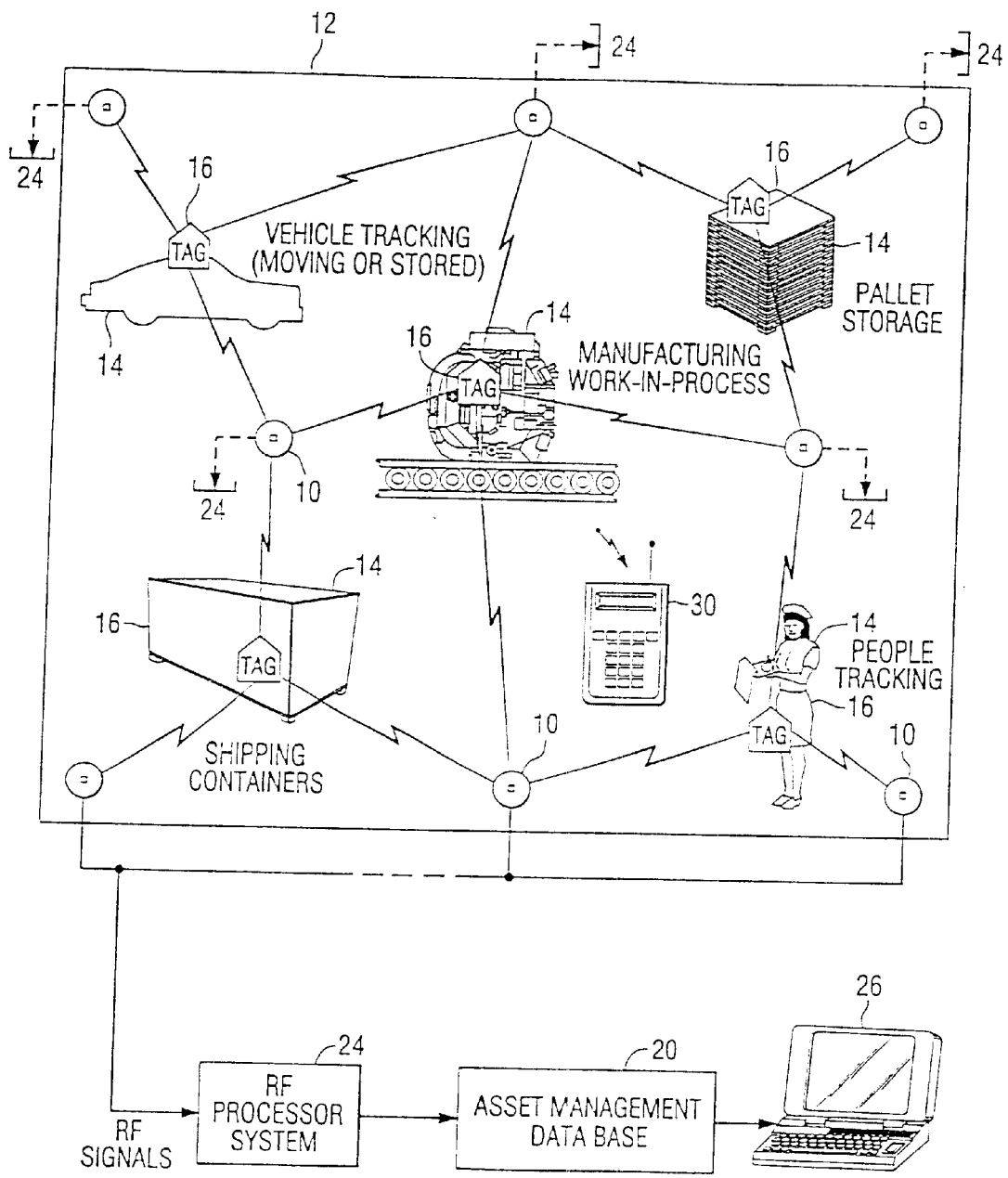
FIG. 1 diagrammatically illustrates the general architecture of a tagged object tracking and location system detailed in the '710 application.
Figure 2:
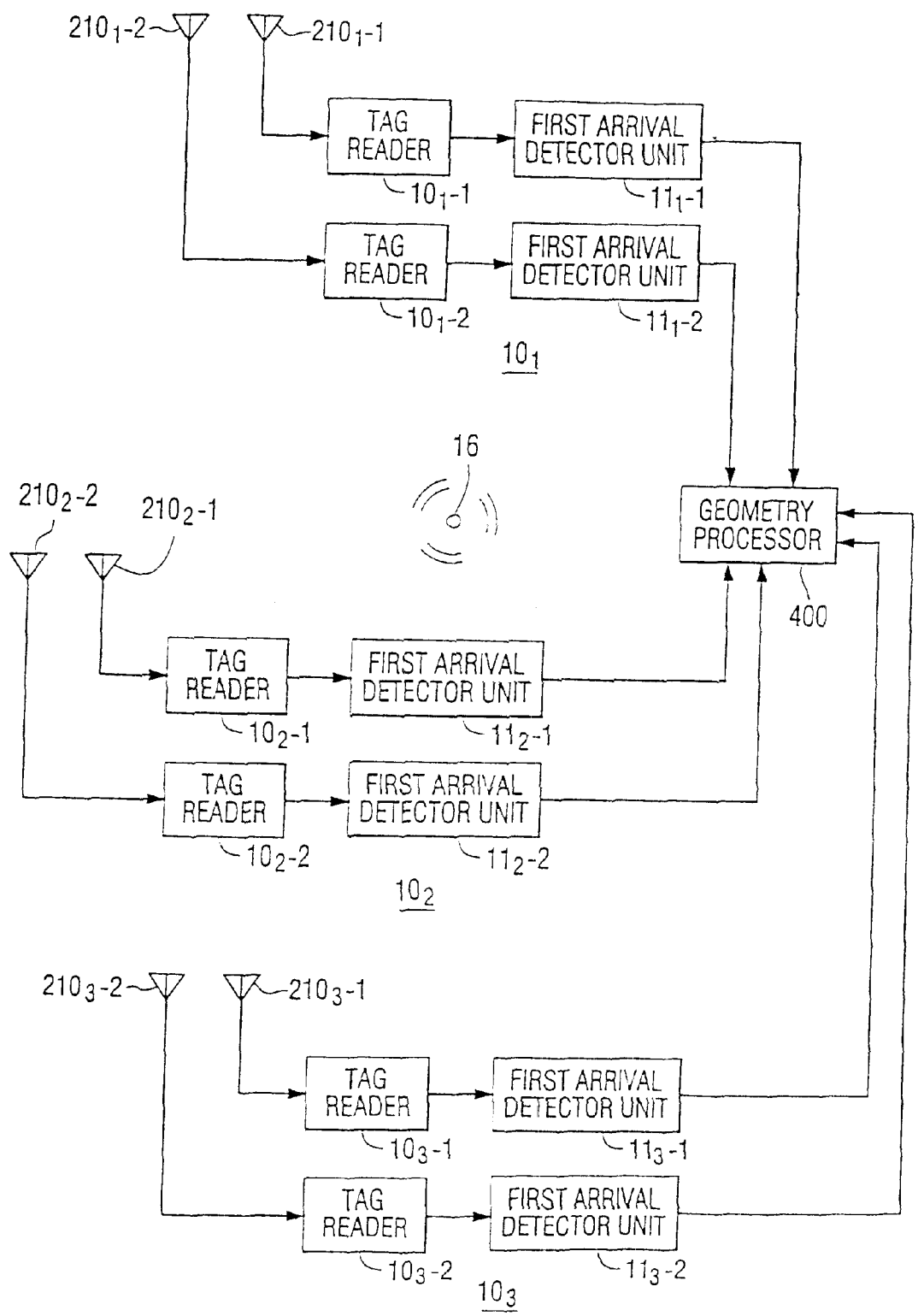
FIG. 2 diagrammatically illustrates a geolocation system of the type illustrated in FIG. 1, that employs spatial diversity-based first wave-front arrival determination.
Figure 3:
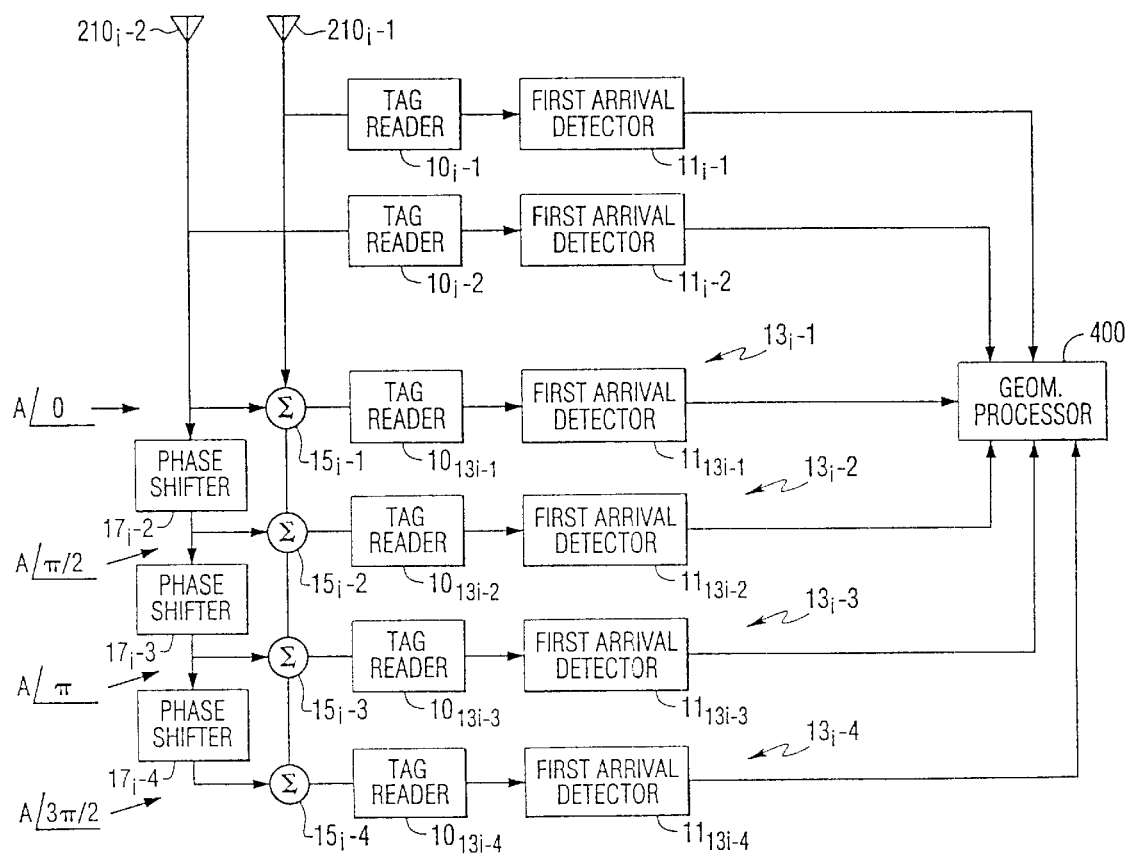
FIG. 3 diagrammatically illustrates a phased array augmentation of the spatial diversity-based geolocation system architecture of FIG. 2.
Figure 4:
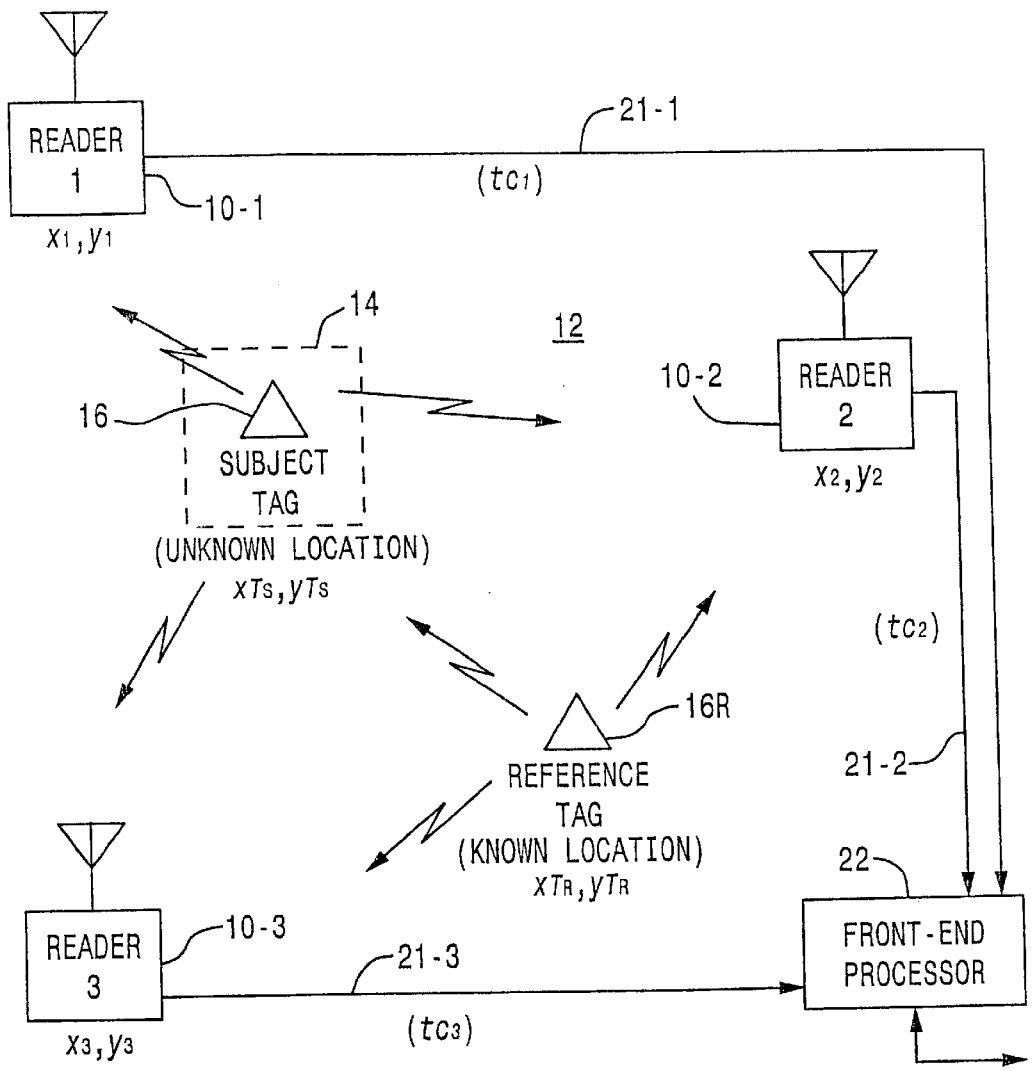
FIG. 4 is a reduced complexity depiction of a radio tag-based geolocation system architecture of the type described above with reference to FIGS. 1–3, containing a 'reference' tag whose geographic coordinates are precisely known.

FIG. 4 is a reduced complexity depiction of a radio tag-based geolocation system architecture of the type described above with reference to FIGS. 1–3, containing an arbitrary number (e.g., three in the illustrated embodiment) of tag emission readers 10-1, 10-2 and 10-3, geographically distributed around an asset management environment 12, and being operative to monitor that environment for emissions from one or more tags 16 affixed to objects 14 which are to be geolocated, typically in terms of their coordinates $x_{T_S}$, $y_{T_S}$. As in the above described systems of FIGS. 1–3, each tag 16 is configured to repeatedly transmit a very short duration, (spread spectrum) pulse of RF energy, encoded with information including but not limited to the identification of the object to which the tag is attached.

The tag emission readers 10-1, 10-2, 10-3 are installed at fixed geographic locations, whose longitude, latitude coordinates $(x_1, y_{1'})$, $(x_2, y_2)$, $(x_3, y_3)$ are precisely known. The spread spectrum signals from a tag as received by the tag readers 10-1, 10-2 and 10-3 are coupled by respective sections or lengths of coaxial cable plant 21-1, 21-2 and 21-3 to a front end processor 22. The signals are correlated with a set of spread spectrum reference signal patterns to determine which spread spectrum signals are first-to-arrive spread spectrum signals transmitted from the tag. These first-to-arrive signals are then processed by means of time-of-arrival differentiation, to geolocate (within a prescribed spatial resolution) the tagged object of interest.

As shown in FIG. 4, the sections of cable plant have associated transport delays or time constants $tc_1$, $tc_2$, $tc_3$, which are not necessarily the same and can be expected to be different from one another. Moreover, the physical environment through which any cable is routed between its reader and the object location processor may encounter a set of ambient conditions that are different from those of cable sections for other readers. As noted earlier, this differential cable length and environment parameter situation creates the possibility of system timing errors, associated with the cable delays drifting due to weather or other effects (e.g., age, humidity, physical stretching, etc.), resulting in geolocation errors.

To effectively remove this timing error problem, the invention places one or more 'reference' tags at precisely known coordinate locations. A reference tag 16R contains the same type of randomly blinking transmitter as those employed by the tags 16 to be tracked, so that its detected RF signature will conform with those of the tags whose locations are unknown. In the reduced complexity example of FIG. 4, a single reference tag 16R is shown as being placed at a known geographical location having coordinates $(x_{TR}, y_{TR})$.

Since the geolocation of each of the one or more reference tags 16R and also those of the readers 10-i are precisely known, then any difference in the calculated position ($x_{CR}$, $y_{CR}$) of a reference tag, as determined by the processor 22, and its actual coordinates ($x_{TR}$, $y_{TR}$) which are precisely known a priori, will be associated with differences in parameters of the various reader-to-processor signal transport paths, including differential cable length and other component variations, that may be due, for example, to weather or other effects (e.g., age, humidity, physical stretching, etc.).

Because any changes in parameters of the various reader-to-processor transport paths can be expected to occur at a relatively slow rate, the reference tags 16R may be configured to blink much slower than the tags 16 of the objects being tracked. This not only serves to effectively extend the battery life of the reference tags relative to that of the object tags, but allows calibration to be performed as a relatively non-intrusive background routine.

Figure 5:
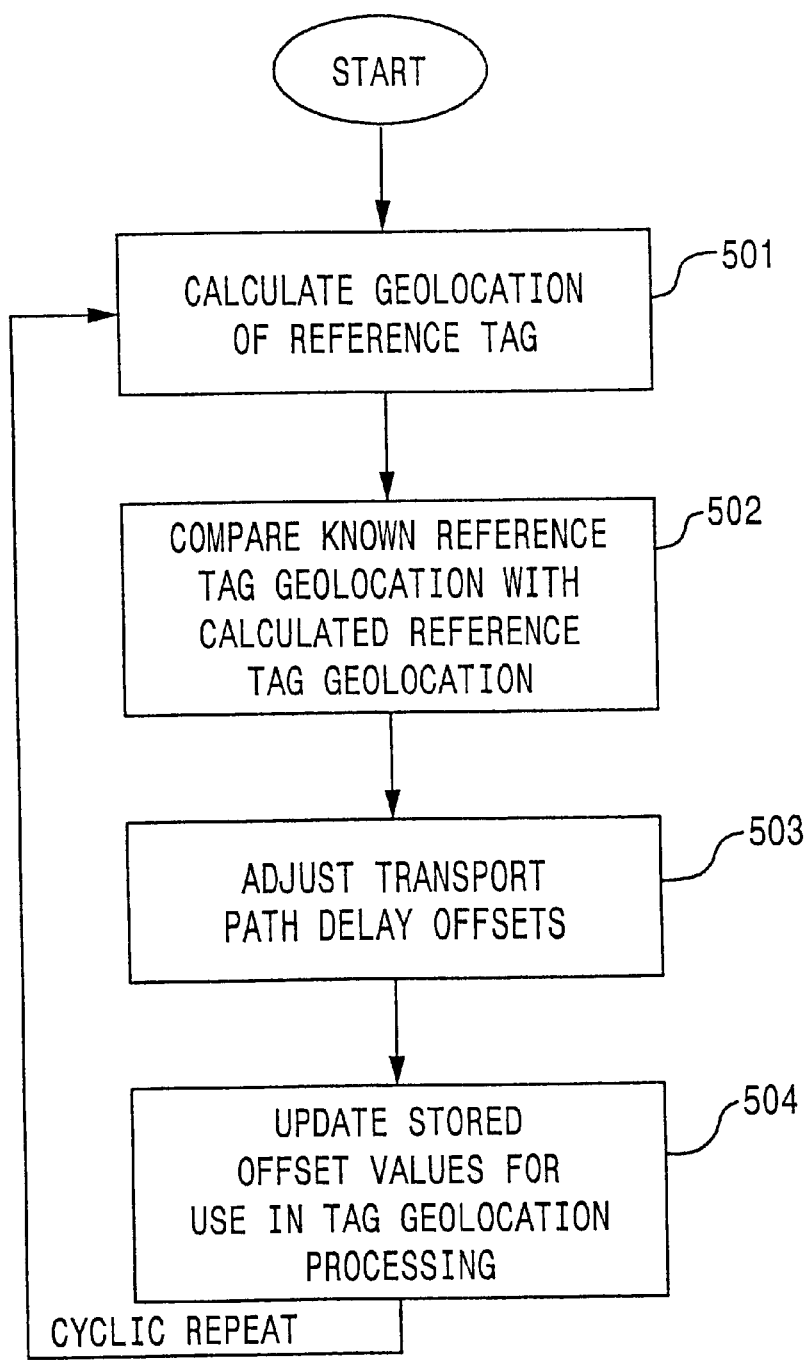
FIG. 5 is a flow chart of the steps of the calibration and timing error removal routine of the present invention.

FIG. 5 is a flow chart of the steps of the calibration and timing error removal routine of the present invention. At step 501 of the routine, using first-to-arrive signals associated with a transmission burst from a respective reference tag 16R, as detected by the tag readers and supplied over the transport paths 21, the object location processor 22 calculates the geolocation of the reference tag 16R. Like the geolocation calculation for each object tag, the geolocation calculation for the reference tag will include the use of a set of dynamically adjustable offsets (due principally to differences in length of cable plant), stored in memory and associated with the respective delays presented by transport paths 21.

Next, in step 502, the true location of the reference tag (previously stored in memory) is compared with its calculated geolocation. As pointed out previously, the precisely known geolocation of a reference tag may be stored in memory employed by the object location processor and/or it may be loaded into memory on board the tag and included as part of the information contained in a reference tag transmission burst.

In step 503, any difference in the two values is used to modify the set of stored offsets used in the geolocation calculations. As a non-limiting example, the offset modification may include a fractional scaling of the stored offset values in proportion to the magnitude of the error between the calculated and known positions of the reference tag, so that over (periodically) repeated calibration cycles, the offset error will asymptotically self-minimize. In step 504, the currently stored offset values are replaced with the updated (modified) offset values, to be used in the course of ongoing tagged object geolocation calculations, prior to the next calibration cycle.

As will be appreciated from the foregoing description, the above-discussed timing error problem associated with signal transport delay differences, such as those based upon varying lengths of cable plant that connect tag emission readers to the object location processor, in a differential time-of-arrival based object geolocation system of the type described in the above-reference Belcher et al patents and co-pending application, is effectively obviated in accordance with the present invention, by placing one or more 'reference' tags, whose geolocations are fixed within the monitored environment and precisely known a priori to operation of the system. Then, during operation of the system, a background calibration routine is periodically exercised at a relatively low cycle rate to process emissions from one or more reference tags. Any offset resulting from a comparison of an emission-based geolocation calculation of a reference tag with its actual (the known a priori) location is used to adjust time delay values for various (cable plant) signal transport paths between the readers and the geolocation processor, thereby tracking out associated timing errors.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. A method of controlling the operation of a system for geolocating objects within a monitored environment, wherein transmissions from tags associated with said objects are detected at a plurality of spaced apart monitoring locations containing tag transmission readers, each respective monitoring location containing a plurality of transmission readers respectively employing mutually diverse antennas to minimize multipath interference at said antennas simultaneously, and outputs of said tag transmission readers are coupled over signal transport paths, having associated signal transport delays, to an object location processor which processes said outputs of said tag transmissions to geolocate said tags and thereby their associated objects within said monitored environment, said method comprising the steps of:

(a) providing within said monitored environment at least one 'reference' tag whose geolocation is known, and which is operative to transmit a reference tag signal encoded with information representative of the identification of said reference tag;

(b) receiving said reference tag signal at said transmission readers, and coupling outputs thereof over said signal transport paths to said object location processor for processing thereby to determine the geolocation of said reference tag;

(c) comparing the geolocation of said reference tag as determined in step (b) with the known geolocation of said reference tag; and (d) controllably adjusting the processing operation carried out by said object location processor to compensate for errors, such as those associated with delays through said signal transport paths, in accordance with a difference between the geolocation of said reference tag as determined in step (b) and the known geolocation of said reference tag.

2. A method according to claim 1, wherein the known geolocation of said reference tag is stored in association with said object location processor.

3. A method according to claim 1, wherein the known geolocation of said reference tag is stored in memory on board said reference tag and included as part of the information contained in the signal transmitted by said reference tag.

4. A method according to claim 1, wherein said object location processor is operative to conduct time-of-arrival differentiation processing of first-to-arrive signals transmitted from a tag to geolocate said tag.

5. A method according to claim 4, wherein said object location processor is operative to carry out said time-of-arrival differentiation of earliest-in-time ones of first-to-arrive signals detected by said tag transmission readers.

6. A method according to claim 5, wherein signals transmitted from said tags comprise spread spectrum RF signals, and wherein a respective tag reader output is coupled to a matched filter correlator having a plurality of matched filter banks containing parallel correlators, which are operative to correlate a received spread spectrum RF signal with successive time offset versions of a reference spreading code corresponding to that of said spread spectrum RF signals.

7. A method according to claim 1, further including, at each monitoring location, a plurality of auxiliary 'phased array' signal processing paths coupled to said mutually diverse antennas to which associated tag transmission readers are coupled, and wherein each auxiliary phased array path is configured to sum energy received from said antennas in a prescribed phase relationship, and to couple a respective energy sum to an associated tag transmission reader, and wherein a further reader output processor is coupled to said associated tag transmission readers, and is operative to process the energy sum supplied to said associated tag transmission reader and to generate a further first-to-arrive signal, and wherein said object location processor is operative to carry out time-of-arrival differentiation of earliest-in-time ones of signals provided by said tag transmission readers.

8. An arrangement for controlling the operation of a system for geolocating objects within a monitored environment, wherein transmissions from tags associated with said objects are detected at a plurality of spaced apart monitoring locations containing tag transmission readers, each respective monitoring location containing a plurality of transmission readers respectively employing mutually diverse antennas to minimize multipath interference at said antennas simultaneously, and outputs of said tag transmission readers are coupled over signal transport paths, having associated signal transport delays, to an object location processor which processes said outputs of said tag transmissions to geolocate said tags and thereby their associated objects within said monitored environment, said arrangement comprising:

at least one 'reference' tag disposed within said monitored environment and whose geolocation is known, and being operative to transmit a reference tag signal encoded with information representative of the identification of said reference tag, said reference tag signal being received at said transmission readers, outputs of which are coupled over said signal transport paths to said object location processor for processing thereby to determine the geolocation of said reference tag;

a calibration mechanism executed by said object location processor and being operative to compare the determined geolocation of said reference tag with the known geolocation of said reference tag, and to controllably compensate for delays through said signal transport paths, in accordance with a difference between the determined geolocation of said reference tag and the known geolocation of said reference tag.

9. An arrangement according to claim 8, wherein the known geolocation of said reference tag is stored in association with said object location processor.

10. An arrangement according to claim 8, wherein the known geolocation of said reference tag is stored in memory on board said reference tag and included as part of the information contained in the signal transmitted by said reference tag.

11. An arrangement according to claim 8, wherein said object location processor is operative to conduct time-of-arrival differentiation processing of first-to-arrive signals transmitted from a tag to geolocate said tag.

12. An arrangement according to claim 11, wherein said object location processor is operative to carry out said time-of-arrival differentiation of earliest-in-time ones of first-to-arrive signals detected by said tag transmission readers.

13. An arrangement according to claim 12, wherein signals transmitted from said tags comprise spread spectrum RF signals, and wherein a respective reader output is coupled to a matched filter correlator having a plurality of matched filter banks containing parallel correlators, which are operative to correlate a received spread spectrum RF signal with successive time offset versions of a reference spreading code corresponding to that of said spread spectrum RF signals.

14. A method for calibrating a system for geolocating objects within a monitored environment, wherein transmissions from tags associated with said objects as detected by tag transmission readers at a plurality of spaced apart monitoring locations are processed to identify first-to-arrive signals transmitted from a tag, each respective monitoring location containing a plurality of transmission readers respectively employing mutually diverse antennas to minimize multipath interference at said antennas simultaneously, and outputs of said tag transmission readers are coupled over signal transport paths, having associated signal transport delays, to an object location processor which processes said outputs of said tag transmission to geolocate said tags and thereby their associated objects within said monitored environment, said method comprising the steps of:

(a) providing within said monitored environment at least one 'reference' tag whose geolocation is known, and which is operative to transmit a reference tag signal encoded with information representative of the identification of said reference tag;

(b) receiving said reference tag signal at said plurality of tag transmission readers, and coupling outputs thereof over said signal transport paths to said object location processor for processing thereby to determine the geolocation of said reference tag;

(c) comparing the geolocation of said reference tag as determined in step (b) with the known geolocation of said reference tag; and (d) controllably adjusting the processing operation carried out by said object location processor to compensate for delays through said signal transport paths based upon a difference between the geolocation of said reference tag as determined in step (b) and the known geolocation of said reference tag.

15. A method according to claim 14, wherein the known geolocation of said reference tag is stored in association with said object location processor.

16. A method according to claim 14, wherein the known geolocation of said reference tag is stored in memory on board said reference tag and included as part of the information contained in the signal transmitted by said reference tag.

17. A method according to claim 14, wherein said object location processor is operative to conduct time-of-arrival differentiation processing of first-to-arrive signals transmitted from a tag to geolocate said tag.

18. A method according to claim 17, wherein said object location processor is operative to carry out said time-of-arrival differentiation of earliest-in-time ones of first-to-arrive signals detected by said tag transmission readers.

* * * * *